(12) United States Patent
Rossignol et al.

(10) Patent No.: US 11,557,406 B2
(45) Date of Patent: Jan. 17, 2023

(54) METHOD OF MANUFACTURING AN ELECTRICALLY CONDUCTIVE THERMOPLASTIC COMPOSITE MATERIAL

(71) Applicant: LIEBHERR-AEROSPACE TOULOUSE SAS, Toulouse (FR)

(72) Inventors: Claude Rossignol, Toulouse (FR); Elise Robert, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 213 days.

(21) Appl. No.: 16/900,920

(22) Filed: Jun. 13, 2020

(65) Prior Publication Data
US 2020/0395144 A1 Dec. 17, 2020

(30) Foreign Application Priority Data
Jun. 14, 2019 (FR) ...................... 1906414

(51) Int. Cl.
| | | |
|---|---|---|
| H01B 1/24 | (2006.01) |
| B29B 9/14 | (2006.01) |
| B29C 45/00 | (2006.01) |
| B64C 1/00 | (2006.01) |
| C08G 65/40 | (2006.01) |
| C08K 3/04 | (2006.01) |
| C08K 7/06 | (2006.01) |
| B29K 71/00 | (2006.01) |

(Continued)

(52) U.S. Cl.
CPC .............. *H01B 1/24* (2013.01); *B29B 9/14* (2013.01); *B29C 45/0001* (2013.01); *B29C 45/0005* (2013.01); *B64C 1/00* (2013.01); *C08G 65/4012* (2013.01); *C08K 3/04* (2013.01); *C08K 7/06* (2013.01); *B29K 2071/00* (2013.01); *B29K 2105/12* (2013.01); *B29K 2307/04* (2013.01); *B29K 2995/0005* (2013.01); *B29L 2031/3076* (2013.01); *B64C 2001/0072* (2013.01); *C08K 2201/001* (2013.01)

(58) Field of Classification Search
CPC ... B29B 9/14; B29C 45/0001; B29C 45/0005; B29C 70/12; B29C 70/882; B29K 2071/00; B29K 2105/12; B29K 2307/04; B29K 2995/0005; B29L 2031/3076; B64C 1/00; B64C 2001/0072; C08G 65/4012; Y02T 50/40
See application file for complete search history.

(56) References Cited

U.S. PATENT DOCUMENTS

| 9,803,061 B2 * | 10/2017 | Hattori | .................... B29C 70/12 |
| 2006/0235135 A1 * | 10/2006 | Takahashi | ................ C08K 7/06 |
| | | | 524/496 |

(Continued)

*Primary Examiner* — Mark Kopec
*Assistant Examiner* — Jaison P Thomas
(74) *Attorney, Agent, or Firm* — CRGO Global; Steven M. Greenberg

(57) ABSTRACT

A method for manufacturing an electrically conductive composite material includes obtaining a composite material which includes a thermoplastic matrix and short carbon fibers and is free of carbon nanotubes, preheating a furnace until a predetermined target temperature is reached, inserting the composite material into the preheated furnace once the target temperature has been reached, and heating the composite material in the furnace at the predetermined target temperature which is kept constant for a predetermined duration.

17 Claims, 2 Drawing Sheets

(51) Int. Cl.
*B29K 105/12* (2006.01)
*B29K 307/04* (2006.01)
*B29L 31/30* (2006.01)

(56) References Cited

U.S. PATENT DOCUMENTS

| | | | |
|---|---|---|---|
| 2010/0162912 A1* | 7/2010 | Kay | C10J 3/00 |
| | | | 102/202.5 |
| 2016/0107739 A1 | 4/2016 | Restuccia et al. | |
| 2017/0154703 A1 | 6/2017 | Lonjon et al. | |

* cited by examiner

[Fig. 1]

but it is this ha…

METHOD OF MANUFACTURING AN ELECTRICALLY CONDUCTIVE THERMOPLASTIC COMPOSITE MATERIAL

BACKGROUND OF THE INVENTION

Field of the Invention

The invention relates to a method for manufacturing a thermoplastic composite material having electrical conductivity properties. The invention also relates to an electrically conductive thermoplastic composite material obtained from said manufacturing method.

Description of the Related Art

Currently, the use of thermoplastic composite materials is becoming more and more frequent in the field of aeronautics because they have numerous advantages over metal alloys. This is because a thermoplastic composite material is composed, for example, of a thermoplastic matrix formed by polyaryletherketone (PAEK), a family of semi-crystalline plastics materials capable of withstanding high temperatures while retaining a very high strength. The benefit of these thermoplastic composite materials can be found in the weight savings, as well as better resistance to fatigue and to the absence of corrosion.

The thermoplastic matrix is combined with reinforcements, which, in the aeronautical field, are mainly carbon fibers for reasons of weight, and thus forms the composite thermoplastic material. The thermoplastic composites are often shaped by injection. This is widely used because it allows high productivity. It is well known that a thermoplastic material formed by a PAEK matrix and carbon fibers is not electrically conductive.

Therefore, in order to make a thermoplastic composite material conductive, it is possible to functionalize this composite material by adding carbon nanotubes. This is because carbon nanotubes have excellent thermal, mechanical and electrical properties. It has also been demonstrated in patent application WO2014023977 that the addition of a particular amount of carbon nanotubes into a thermoplastic matrix makes it possible to improve the electrical conductivity of a thermoplastic material. However, integrating carbon nanotubes into a thermoplastic matrix is a complex and expensive process. This is because, during an injection process for creating the composite material, it is difficult to homogeneously disperse the carbon nanotubes within the thermoplastic matrix. Furthermore, the step of integrating carbon nanotubes can be difficult since the dispersion of carbon nanotubes is dependent on the type of matrix used, on the nature of the carbon nanotubes and on the viscosity of the matrix. When carbon nanotubes are inserted into the matrix during injection, the viscosity of the mixture increases, which complicates the process of obtaining a thermoplastic material by injection. Moreover, the electrical percolation threshold, which corresponds to a critical concentration of conductive particles that makes it possible to increase the electrical conductivity, is heavily dependent on the dispersion of carbon nanotubes in the matrix.

As such, the invention aims to remedy the disadvantages of the prior art by developing a method for obtaining thermoplastic composite materials which have a significantly improved electrical conductivity.

BRIEF SUMMARY OF THE INVENTION

To this end, the invention relates to a method for manufacturing an electrically conductive composite material.

A method according to the invention is characterized in that it comprises at least the following steps:

a step of obtaining said composite material which comprises a thermoplastic matrix and carbon fibers and is free of carbon nanotubes, a step of preheating a furnace until a predetermined target temperature is reached, a step of inserting said composite material into said preheated furnace once the target temperature has been reached, and a step of heating said composite material in said furnace at the predetermined target temperature which is kept constant for a predetermined duration.

Composite material is understood to mean a thermoplastic composite material, also referred to as a thermoplastic composite or thermoplastic or thermostable material, which comprises a matrix consisting of a high-performance thermoplastic polymer formed by aromatic rings. Thermoplastic polymers are rigid materials which are resistant to relatively high temperatures (up to 250¬∞C. to 300¬∞C. depending on the thermoplastic materials). They are also considered to be insulating materials having low electrical conductivity values (between 10-20 Siemens/meter (S/m) and 10-10 S/m).

Electrical conductivity describes the electrical properties of conductive materials and denotes the ability of the material to conduct electric current. In the present application, a conductive material is understood to mean a material capable at least of discharging static electricity. A conductive material of this kind can, for example, have an electrical conductivity greater than or equal to 10 S/m.

The composite material according to the invention is formed by a thermoplastic matrix comprising a polymer and short carbon fibers, thus making it possible to improve the temperature resistance of the polymer matrix very significantly. In addition, the presence of carbon fibers makes it possible to maintain the mechanical properties of the thermoplastic matrix which can be used for temperatures up to 300¬∞C. Short carbon fibers are understood to mean particularly fine carbon fibers which have a diameter in the range of one to ten micrometers and a length of between 10 and 500 micrometers and which are composed almost exclusively of carbon atoms.

More particularly, a composite material according to the invention comprises a thermoplastic matrix formed from a thermoplastic polymer, short carbon fibers, and is free of carbon nanotubes. Carbon nanotubes are understood to mean graphite sheets which are formed of carbon atoms arranged in a hexagonal network and of which the diameter is in the nanometer range and the length can reach several micrometers.

The manufacturing method according to the invention unexpectedly makes it possible to obtain an electrically conductive composite material, more particularly having an electrical conductivity greater than that of a composite material comprising carbon nanotubes. Said composite material obtained by the manufacturing method according to the invention has an electrical conductivity greater than 102 S/m.

In other words, said method is advantageous in that it is easier to implement since it is not necessary to functionalize a thermoplastic composite material by adding carbon nanotubes so that it becomes electrically conductive. Moreover, the absence of carbon nanotubes also facilitates the manufacturing method according to the invention, since the constraints involved in integrating carbon nanotubes into the thermoplastic matrix do not arise.

Contrary to what is described in the prior art relating to the addition of carbon nanotubes, it has been unexpectedly demonstrated that the manufacturing method according to the invention improves the electrical conductivity of a thermoplastic material that is free of carbon nanotubes. The elimination of carbon nanotubes facilitates the step of obtaining a thermoplastic material. More precisely, it makes it possible to eliminate both the viscosity constraints and the constraints relating to the step of homogenously dispersing carbon nanotubes in a thermoplastic matrix.

Said manufacturing method comprises a step of obtaining said composite material. The obtaining step involves having (or manufacturing) a thermoplastic composite material which comprises a thermoplastic matrix and short carbon fibers and is free of carbon nanotubes.

Furthermore, said manufacturing method comprises a step of preheating a furnace, which step involves preheating a furnace which is used during the heat treatment. Preheating is achieved at a predetermined target temperature. The predetermined target temperature is the fixed temperature at which the furnace is when it has been preheated, and is maintained for the entire duration of the heat treatment.

Moreover, said manufacturing method comprises a step of inserting said composite material into said preheated furnace once the target temperature has been reached.

Moreover, said manufacturing method comprises a step of heating said composite material in said furnace at the predetermined target temperature which is kept constant for a predetermined duration. In the present description, the term "constant" is understood to mean that the target temperature is reached and remains substantially the same throughout the entire duration of a heat treatment, with a variation of plus or minus $10\text{-}\infty C$.

The steps of inserting and heating said composite material form the heat treatment which involves aging said thermoplastic material. Aging makes it possible to subject said thermoplastic material to a chemical modification, in particular at the level of the matrix organization. Heat treatment acts directly on the macromolecular chains by reducing their movements. This consequently results in a change in crystalline morphology which in turn results in an increase in the degree of crystallinity and therefore of crosslinking. The favorable development of the degree of crystallinity thus promotes the electrical conductivity of the thermoplastic material treated by said heat treatment and in particular by the heating step.

Advantageously and according to the invention, said step of obtaining said composite material involves mixing short carbon fibers in said thermoplastic matrix to form granules, and then assembling said granules to form said composite material.

According to this variant, said obtaining step comprises a first step of mixing the carbon fibers and the thermoplastic matrix to form granules and a second step of assembling the granules, which involves assembling the granules together to form said composite material in the form of a test piece or part.

Advantageously and according to the invention, said granules are assembled to form said composite material by means of a high-pressure injection molding process.

According to this variant, said composite material is obtained by means of a high-pressure injection molding process. The high-pressure injection molding process makes it possible to automate the method and makes it possible to have a thermoplastic material having advantageous properties such as mechanical strength, resistance to corrosion, and tensile strength.

The absence of carbon nanotubes also simplifies the use of the injection molding process, since the constraints linked to viscosity and dispersion in the thermoplastic matrix do not arise.

Other methods known to a person skilled in the art can be used to form the thermoplastic material obtained during the obtaining step.

Advantageously and according to the invention, said mixing step is replaced by a step of acquiring the commercial material PEEK 90HMF40 from the brand VICTREX™ in the form of granules, for example.

According to this variant, said composite material is obtained from granules of a material sold under the name PEEK 90HMF40 from the brand VICTREX™. This material comprises a thermoplastic matrix formed from a polyether ether ketone polymer, into which approximately 40% of short carbon fibers are integrated.

Said commercial material is easily accessible because it is simple to obtain the material in the form of granules. Moreover, the mixing step is replaced by the purchase of granules which are ready to be assembled to form the composite material which is treated by said manufacturing method according to the invention in order to obtain the electrically conductive thermoplastic composite material according to the invention.

Furthermore, the use of this commercial material makes it possible to dispense with said mixing step by replacing it with purchasing the material in the form of granules.

Advantageously and according to the invention, said thermoplastic matrix is a polyketone, preferably polyether ether ketone.

According to this variant, said thermoplastic matrix is a polyketone which is part of the family of high performance thermoplastic polymers. More particularly, said polymer is a polyaryletherketone (PAEK) and mainly from polyether ether ketone (PEEK) or polyether ketone ketone (PEKK). The advantage of this type of matrix lies in the lightness of the material, which is of real interest in the aeronautical field.

In fact, PEEK has many advantages, in particular its resilience, its mechanical modulus, its thermal resistance and its chemical inertness. In addition, PEEK is a high performance material that can withstand high temperatures (in the range of $200\text{-}\alpha C$. to $300\text{-}\infty C$.).

Advantageously and according to the invention, said composite material comprises a mass content of short carbon fibers of between 20 and 45%.

According to this variant, said composite material comprises at least 20% short carbon fibers, preferably 20 to 50% and more preferably 20 to 45%. The short carbon fibers provide said composite material with improved thermal and mechanical resistance as well as dimensional stability. Moreover, during the step of heating said composite material, the short carbon fibers contribute to increasing the crosslinking of the thermoplastic matrix and thus allow an improvement in the electrical conductivity when said thermoplastic material is heated at a target temperature for a particular duration.

Advantageously and according to the invention, said predetermined duration of said step of heating said composite material varies depending on said predetermined target temperature.

According to this variant, the lower the predetermined target temperature, the longer the predetermined duration of said step of heating said composite material.

Moreover, the duration of the heat treatment can be adapted according to the electrical conductivity to be achieved for a thermoplastic material. This is because, when said furnace reaches a predetermined target temperature and the composite material is introduced into said furnace, the longer the duration of the step of heating said material, the more the conductivity of the thermoplastic material is improved.

Moreover, the temperature can also be adjusted according to the duration of the heat treatment. This is because the higher the temperature of the furnace, the shorter the duration of the heating step of the heat treatment. The duration of the heating step therefore varies according to the temperature and vice versa.

Advantageously and according to the invention, said predetermined target temperature is between 100°C. and 350°C.±10°C., preferably between 200°C. and 300°C.±10°C.

According to this variant, said composite material is subjected to a heating step for a predetermined duration in a furnace preheated to a predetermined fixed temperature. Once this temperature has been reached during the step of preheating said furnace, the predetermined temperature is kept fixed and constant during the step of heating said composite material. In other words, the temperature is said to be constant when it is generally maintained at the target temperature and a deviation of plus or minus 10°C. is allowed during the step of heating said composite material.

Advantageously and according to the invention, said predetermined duration of said heating step is between 30 minutes and 150 hours, preferably between 5 and 100 hours.

According to this variant, said predetermined duration of the step of heating said composite material corresponds to the duration during which said thermoplastic composite material is heated in said furnace at a target temperature which is constant.

When the duration of the step of heating said composite material increases, the electrical conductivity is improved.

The invention also relates to an electrically conductive composite material obtained from said manufacturing method according to the invention.

According to a variant of the invention, said electrically conductive composite material obtained from said manufacturing method has an electrical conductivity of between 101 Siemens/meter and 103 Siemens/meter.

Moreover, said composite material which comprises short carbon fibers, is free of carbon nanotubes and is manufactured by the method according to the invention therefore has a high electrical conductivity in the range of 50 to 200 Siemens/meter (S/m) for a treatment duration of between two hours and 30 hours.

According to this variant, said electrically conductive composite material obtained from said manufacturing method is a self-heating material. In other words, an increase in the temperature of the composite material is generated when an electric current passes through said electrically conductive composite material. Consequently, said electrically conductive composite material allows an electric current to pass through and can thus ensure that the temperature of a part formed by said composite material is maintained or that said part is de-iced.

The invention also relates to a use of said electrically conductive composite material according to the invention, to form parts intended to be arranged in a transport vehicle, in particular a rail vehicle or an air vehicle.

Advantageously and according to the invention, said electrically conductive composite material is used to maintain the temperature of said parts intended to be arranged in a transport vehicle.

According to this variant, the parts formed by said composite material are electrically conductive and can maintain a desired temperature. This also makes it possible to avoid losses by conduction and to reheat said part to increase performance. For example, a duct formed by said electrically conductive composite material maintains the temperature of said duct in order to limit heat exchanges.

The invention therefore makes it possible to obtain a method for maintaining the temperature, which involves using a part formed by an electrically conductive composite material and supplying this part with an electric current so as to increase the temperature of said part in order to allow the temperature of said part to be maintained.

Advantageously and according to the invention, said electrically conductive composite material is used to de-ice said parts intended to be arranged in a transport vehicle.

According to this variant, the parts formed by said composite material are electrically conductive and can be de-iced when an electric current passes through them.

The invention therefore makes it possible to obtain a de-icing method which involves using a part formed by an electrically conductive composite material and supplying this part with an electric current so as to increase the temperature of said part in order to allow it to de-ice.

The invention also relates to an apparatus of an air vehicle, in particular a pneumatic valve body, an actuator body, a mixing chamber, a low-pressure delivery pipe, a turbine volute, or an electric enclosure, comprising said composite material according to the invention.

Furthermore, any apparatus of an air vehicle that is formed by a composite material can be formed by a composite material according to the invention.

According to one variant, the apparatuses formed by a composite material can be arranged either in an air system, such as turbines or condensers, or in another system outside the air system, such as a leading edge slat on a wing unit or wings of a turboprop aircraft. Moreover, an apparatus formed by a composite material can be reheated when an electric current passes through it in order for the temperature thereof to be maintained or in order to be de-iced.

Furthermore, the apparatuses formed by said composite material are lighter than the apparatuses formed by an aluminum alloy, which therefore makes it possible to lighten the air vehicle in which said apparatuses are arranged.

The advantages of such a manufacturing method according to the invention apply mutatis mutandis to said material obtained by the method according to the invention, to said use of the material according to the invention and to said assembly comprising the composite material according to the invention.

The invention also relates to a method for manufacturing an electrically conductive thermoplastic composite material, characterized in combination by all or some of the features mentioned above or below.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

The method described in the following makes it possible to manufacture an electrically conductive thermoplastic material which comprises only one thermoplastic matrix and short carbon fibers and is free of carbon nanotubes.

Figure 1:
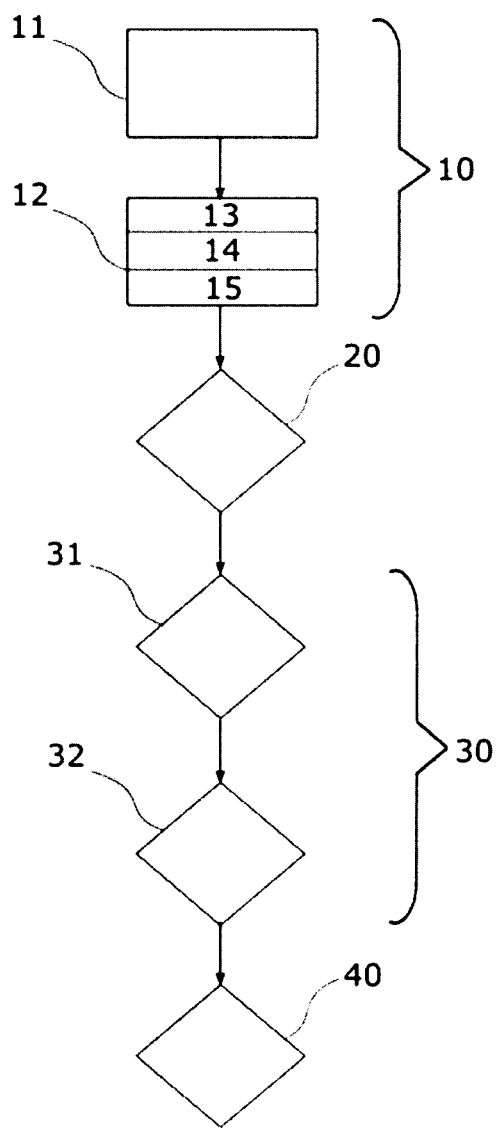
FIG. 1 is a schematic view of a method for manufacturing a thermoplastic composite material according to one embodiment of the invention.

A manufacturing method according to one embodiment, as shown in FIG. 1, can comprise:
a step 10 of obtaining the composite material,
a step 20 of preheating the furnace,
a step 31 of inserting the composite material obtained in step 10,
a step 32 of heating the composite material inserted into the furnace during step 31, and
a step 40 of cooling the electrically conductive composite material.

According to this embodiment, the step 10 of obtaining the composite material comprises a first compounding step 11 which allows the components (short carbon fibers and PEEK polymer) to be mixed in order to obtain granules of composite material. The mixing of the components is carried out together with softening of the PEEK polymer.

The compounding step, which involves mixing plastics materials and additives, makes it possible to obtain thermoplastic materials used in the form of "compounds", which are also referred to as composites or plastics granules. In this embodiment, the PEEK thermoplastic matrix and the carbon fibers are mixed to obtain the composite material in the form of granules.

The first mixing step 11 can also be replaced by the commercial purchase of a composite material in the form of granules.

Generally, the granules are then assembled by being melted, extruded or molded to manufacture parts of thermoplastic material. According to one embodiment, the granules can be assembled to form plates according to the hot plate press method. The plates obtained can then be shaped as needed to form a part and in particular an apparatus of an aircraft such as an enclosure, for example.

According to another embodiment, the granules can be injection molded to form parts of thermoplastic material.

The second step 12 is carried out according to this latter embodiment which involves assembling granules of composite material obtained during the mixing step 11 in order to form the test pieces of thermoplastic composite materials by injection molding. Test piece is understood to mean a material in the form of manufacturing parts which are standardized and intended to be used to study the behavior of a material.

Injection molding, also referred to as plastics injection molding, involves manufacturing parts from thermoplastic material in the form of powder or granules using plastics injection molding presses. The thermoplastic material in the form of granules or powder is introduced into a hopper in order to feed a plasticizing screw contained in a heated sheath. A first plasticization phase 13 allows the material to pass from a solid state into a state melted by the heat provided by the resistance and the shear induced by the rotation of the screw. Then follows the injection phase 14 which involves pushing the material into a hot mold by means of the screw. The compacting phase 15 makes it possible to keep pressure on the cavity which fills with thermoplastic material as the part cools and shrinks.

The step 20 of preheating the furnace involves preheating the furnace into which the composite materials obtained in step 10 are introduced. The furnace is designed to be able to reach the predetermined target temperature, i.e. the furnace temperature at which the composite materials can be heated. Preheating the furnace allows the furnace to be heated until, in this embodiment, a temperature of 250¬∞C. is reached with an acceptable variation of ¬±10¬∞C. The temperature of the furnace is measured by means of a temperature sensor or a temperature recorder integrated in the furnace. According to this embodiment, the preheating time to reach the temperature of 250¬∞C. depends on the furnace used and its performance.

The step 31 of inserting the composite material involves inserting the test pieces of thermoplastic composite materials obtained in step 10 into the furnace which is preheated and has reached the target temperature that, according to this embodiment, is 250¬∞C.

Figure 2:
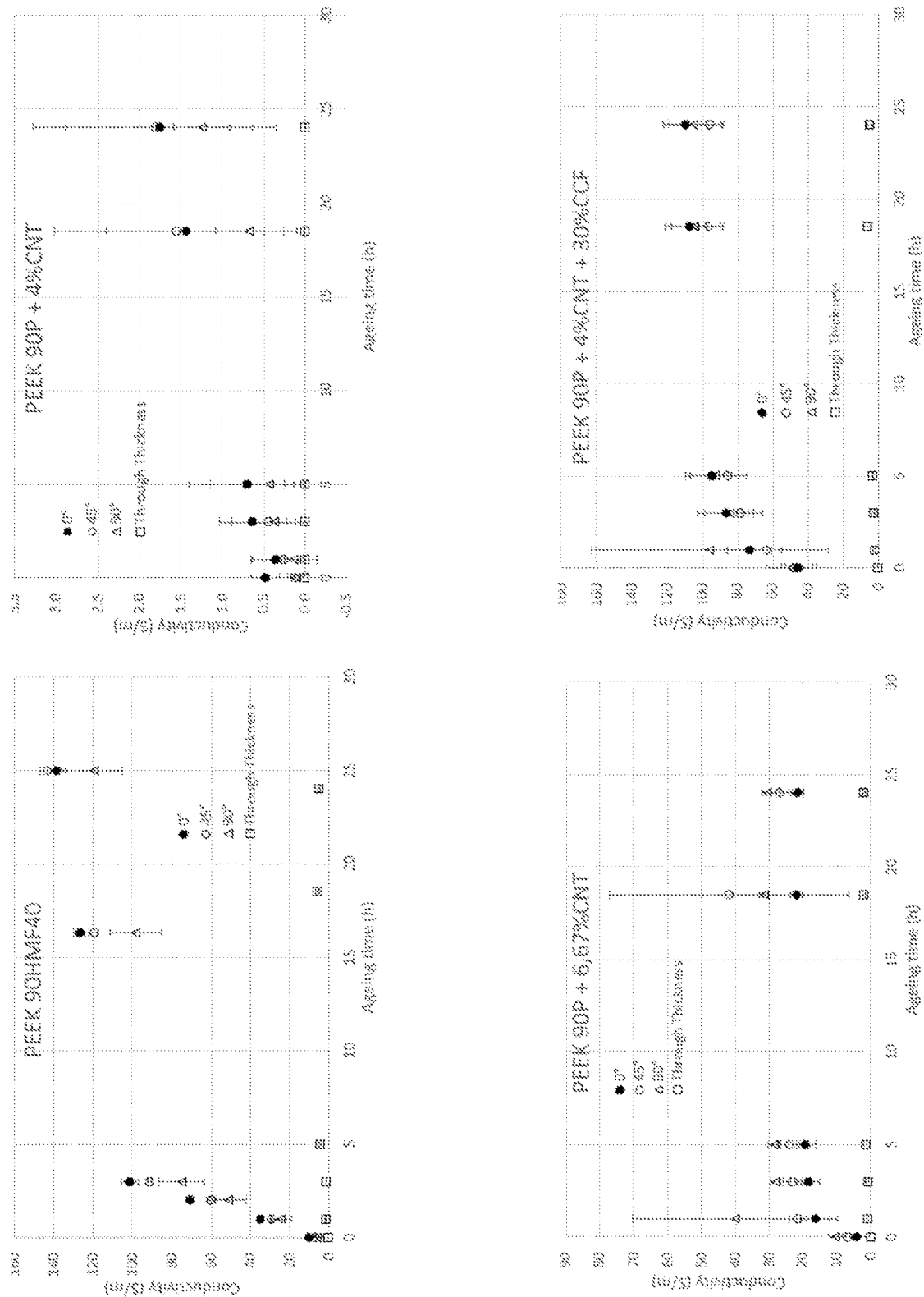
FIG. 2 represents the development of the electrical conductivity of materials which have different compositions and have been treated by the manufacturing method according to one embodiment of the invention.

The heating step 32 makes it possible to heat the test pieces inserted into the furnace at 250¬∞C. for a predetermined duration. For example, for the materials tested as shown in FIG. 2, test pieces were used which were each heated for durations of 1 hour, 3 hours, 5 hours, 16 hours, 18 hours, 24 hours and 25 hours.

The heating of the test pieces is achieved by maintaining the furnace at the target temperature.

The test pieces were then removed from the furnace when the predetermined duration had been reached (1 hour, 3 hours, 5 hours, 16 hours, 18 hours, 24 hours and 25 hours depending on the materials) and the step 40 of cooling the electrically conductive composite material allowed the test pieces which had been subjected to the heat treatment to cool. The test pieces were cooled in ambient air for 30 minutes.

After the test pieces of composite material had cooled, the conductivity measurement was carried out.

According to one variant, a series of heating steps can be provided. Each heating step is characterized by a predetermined temperature and duration that are different from the previous heating step. By way of example, it is possible to provide a first heating step in a furnace at 250¬∞C. for 5 hours, followed by a second heating step in a furnace at 190¬∞C. for 2 hours.

FIG. 2 shows graphs representing the development of the electrical conductivity as a function of the duration of a heat treatment 30 comprising a step 31 of inserting the material and a step 32 of heating the material.

The materials analyzed in FIG. 2 are in the form of test pieces which have been subjected to the aging process according to the heat treatment 30 of the manufacturing method. Four thermoplastic materials, each having a different composition, are analyzed before (0h of heat treatment) and after heat treatment (1 hour, 3 hours, 5 hours, 16 hours, 18 hours, 24 hours and 25 hours depending on the materials).

The various materials tested and presented in FIG. 2 all comprise a base of polyether ether ketone (PEEK).

The material PEEK 90HMF40 is a polymer known under the trade name of the product sold by VICTREX™ and comprises a PEEK polymer reinforced with short carbon fibers at a content of 40%.

The material PEEK 90P+4% CNT is a virgin PEEK polymer in which 4% carbon nanotubes have been integrated into the matrix.

The material PEEK 90P+6.67% CNT is a virgin PEEK polymer in which 6.67% carbon nanotubes have been integrated into the matrix.

The material PEEK 90P+4% CNT+30% CCF is a virgin PEEK polymer in which 4% carbon nanotubes have been integrated into the matrix comprising 30% short carbon fibers.

The three materials cited above (PEEK 90P+4% CNT, PEEK 90P+6.67% CNT and 90P+4% CNT+30% CCF) were heat treated in order to be able to compare the results of these heat treatments with the results obtained by a method according to the invention (implemented according to an embodiment using a 90HMF40 material).

The test pieces of 90HMF40 material were obtained from commercially purchased granules. The granules were subsequently subjected to the assembly step 12 according to the method of FIG. 1 in order to form the test pieces.

The materials are in the form of test pieces, the dimensions of which are as follows: 80 millimeters (mm) in length and 10 mm in width. The test pieces formed by the 90HMF40 material have a thickness of 2 mm and the test pieces formed by the other materials have a thickness of 3 mm.

Test pieces of each material described above were introduced into a furnace preheated to a temperature of 250¬∞C and then were heated for 1 hour, 3 hours, 5 hours, 16 hours, 18 hours, 24 hours and 25 hours (depending on the materials) in the furnace at a constant temperature of 250¬∞C.

The temperature of the furnace is kept constant for the duration of the step of heating the test pieces of composite material and can be checked by means of a temperature sensor or a temperature recorder integrated in the furnace.

The electrical conductivity is measured on all of the test pieces which have been subjected to the heat treatment and therefore the heating step for different durations (1 hour, 3 hours, 5 hours, 16 hours, 18 hours, 24 hours and 25 hours). This makes it possible to establish a curve showing the development of the electrical conductivity according to the duration of the heating step.

The electrical conductivity is measured in Siemens per meter (S/m) by means of electrical tests carried out on test pieces, for example using a Keithley 6517B ohmmeter and an input voltage of less than 5V. Each end of the test pieces is covered with a silver paint to allow the conductivity to be measured. These electrical tests are carried out at room temperature using low electric current values (in the mA range) in order to avoid the phenomena of heating of the test pieces.

The electrical conductivity is measured on all of the test pieces according to four different test configurations:

0¬∞ direction: study of the electrical conductivity at 0¬∞ in the direction of the fibers with respect to the injection;

45¬∞ direction: study of the electrical conductivity at 45¬∞ in the direction of the fibers with respect to the injection;

90¬∞ direction: study of the electrical conductivity at 90¬∞ in the direction of the fibers (direction transverse to the fibers) with respect to the injection;

thickness direction of a plate: study of the electrical conductivity in the thickness of a test piece plate.

The graphs in FIG. 2 show a general trend toward a significant increase in the electrical conductivity when a material has been subjected to the aging process and in particular to the heating step.

It is found that, when the material is heated for at least one hour, the heating step of the heat treatment gradually makes the composite material electrically conductive. When the composite material is not treated by heating, it is not electrically conductive. Heating will make it possible to make a thermoplastic material electrically conductive.

Moreover, the longer the duration of the step of heating the material, the more the electrical conductivity increases. This result is observed on all PEEK materials, regardless of whether or not they are free of carbon nanotubes.

It is also observed that, in the absence of carbon nanotubes as shown by the PEEK 90HMF40 material, the electrical conductivity very significantly increases up to 10 times when the material has been subjected to the heat treatment for a duration of 25 hours.

In addition, the electrical conductivity of the PEEK 90HMF40 material treated for 25 hours is 140 S/m, against 110 S/m for the PEEK 90P+4% CNT+30% CCF material treated for 25 hours. It is found that a material which is free of nanotubes and has been subjected to the heat treatment has sufficient electrical conductivity, i.e. a conductivity which at least allows static electricity to be discharged from the material.

These results therefore make it possible to identify a method which is faster and easier to implement and which will therefore be less costly due to the elimination of carbon nanotubes.

It is also noted that the orientation of the carbon fibers influences the electrical conductivity when analyzed in the 0¬∞, 45¬∞ or 90¬∞ direction in the direction of the fibers. However, the influence of the orientation of the fibers is negligible by comparison with the effects of the applied heat treatment. The electrical conductivity is very low and the heat treatment has no effect when said conductivity is analyzed together with the orientation according to the thickness of the plate, for all of the test pieces of the four materials, which were heated for different durations. This confirms that the electrical conductivity in the thermoplastic material is allowed through the carbon fibers and thus takes place in the direction of the fiber. The presence of carbon nanotubes does not lead to a significant increase in electrical conductivity.

Moreover, the main advantage of this invention is that of using a material which is already known and qualified by certain parties involved in aeronautics and which, by means of a heat treatment, reaches values of sufficient conductivity, i.e. which at least allow static electricity to be discharged. Furthermore, it is not necessary to manufacture parts comprising carbon nanotubes, which is difficult and expensive, and which requires a new material for aeronautics to be selected.

Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. A method for manufacturing an electrically conductive composite material, said method comprising at least the following steps:
    obtaining said composite material which comprises a thermoplastic matrix and short carbon fibers and is free of carbon nanotubes, said short carbon fibers having a diameter in the range of one to ten micrometers and a length of between 10 and 500 micrometers,
    preheating a furnace until a predetermined target temperature is reached,
    inserting said composite material into said preheated furnace once the target temperature has been reached, and
    heating said composite material in said furnace at the predetermined target temperature which is kept constant for a predetermined duration, so as to provide a composite material having an electrical conductivity in the range of 50 to 200 S/m.

2. The method according to claim 1, wherein said obtaining said composite material involves mixing short carbon fibers in said thermoplastic matrix to form granules, and then assembling said granules to form said composite material.

3. The method according to claim 2, wherein said granules are assembled to form said composite material by means of a high-pressure injection molding process.

4. The method according to claim 1, wherein said thermoplastic matrix is a polyether ether ketone.

5. The method according to claim 1, wherein said composite material comprises a mass content of short carbon fibers of between 20 and 45%.

6. The method according to claim 1, wherein said predetermined duration of said step of heating said composite material varies depending on said predetermined target temperature.

7. The method according to claim 1, wherein said predetermined target temperature is between 200° C. and 300° C.±10° C.

8. The method according to claim 1, wherein said predetermined duration of said heating step is between 5 and 100 hours.

9. An electrically conductive composite material comprising:
    a thermoplastic matrix and
    short carbon fibers having a diameter in the range of one to ten micrometers and a length of between 10 and 500 micrometers
    the material being free of carbon nanotubes,
    the material produced by:
        preheating a furnace until a predetermined target temperature is reached,
        inserting said composite material into said preheated furnace once the target temperature has been reached, and
        heating said composite material in said furnace at the predetermined target temperature which is kept constant for a predetermined duration so as to provide a composite material having an electrical conductivity in the range of 50 to 200 S/m.

10. A transport vehicle comprising a rail vehicle or an air vehicle, the transport vehicle comprising:
    an arrangement of parts comprising an electrically conductive composite material comprising:
    a thermoplastic matrix and
    short carbon fibers having a diameter in the range of one to ten micrometers and a length of between 10 and 500 micrometers
    the material being free of carbon nanotubes,
    the material produced by:
        preheating a furnace until a predetermined target temperature is reached,
        inserting said composite material into said preheated furnace once the target temperature has been reached, and
        heating said composite material in said furnace at the predetermined target temperature which is kept constant for a predetermined duration so as to provide a composite material having an electrical conductivity in the range of 50 to 200 S/m.

11. An apparatus of an air vehicle, comprising an electrically conductive composite material comprising:
    a thermoplastic matrix and
    short carbon fibers having a diameter in the range of one to ten micrometers and a length of between 10 and 500 micrometers
    the material being free of carbon nanotubes,
    the material produced by:
        preheating a furnace until a predetermined target temperature is reached,
        inserting said composite material into said preheated furnace once the target temperature has been reached, and
        heating said composite material in said furnace at the predetermined target temperature which is kept constant for a predetermined duration so as to provide a composite material having an electrical conductivity in the range of 50 to 200 S/m.

12. The apparatus of claim 11, wherein apparatus is a pneumatic valve body.

13. The apparatus of claim 11, wherein the apparatus is an actuator body.

14. The apparatus of claim 11, wherein the apparatus is a mixing chamber.

15. The apparatus of claim 11, wherein the apparatus is a low-pressure delivery pipe.

16. The apparatus of claim 11, wherein the apparatus is a turbine volute.

17. The apparatus of claim 11, wherein the apparatus is an electric enclosure.

* * * * *